United States Patent
Song et al.

(10) Patent No.: US 11,635,324 B2
(45) Date of Patent: Apr. 25, 2023

(54) METHOD FOR QUICK WEIGHING OF LOOSE AND SMALL PACKAGES OF TRADITIONAL CHINESE MEDICINE (TCM)

(71) Applicant: Chongqing University, Chongqing (CN)

(72) Inventors: Yongduan Song, Chongqing (CN); Zhixi Shen, Chongqing (CN); Haifeng Liu, Chongqing (CN); Jie Lei, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 103 days.

(21) Appl. No.: 17/203,443

(22) Filed: Mar. 16, 2021

(65) Prior Publication Data
US 2022/0155136 A1    May 19, 2022

(30) Foreign Application Priority Data
Nov. 13, 2020  (CN) .......................... 202011269239.0

(51) Int. Cl.
*G01G 23/01*  (2006.01)
*G01G 23/44*  (2006.01)

(52) U.S. Cl.
CPC .............. *G01G 23/44* (2013.01); *G01G 23/01* (2013.01)

(58) Field of Classification Search
CPC ............................... G01G 23/01; G01G 23/44
See application file for complete search history.

(56) References Cited

U.S. PATENT DOCUMENTS

| | | | | |
|---|---|---|---|---|
| 3,643,753 A | * | 2/1972 | Godwin ................. | G01G 15/00 177/210 R |
| 4,231,439 A | * | 11/1980 | Hall, Jr. ............... | G01G 19/035 177/25.14 |
| 4,817,026 A | * | 3/1989 | Inoue ..................... | G01G 23/06 702/199 |
| 5,166,892 A | * | 11/1992 | Inoue ...................... | G01D 3/02 73/765 |
| 5,178,228 A | * | 1/1993 | Feinland .......... | G07B 17/00661 177/185 |
| 2003/0215100 A1 | * | 11/2003 | Kimura .................. | G01G 3/147 381/71.11 |

* cited by examiner

*Primary Examiner* — Randy W Gibson
(74) *Attorney, Agent, or Firm* — Mark C. Johnson; Johnson Dalal

(57) ABSTRACT

The present disclosure discloses a method for quick weighing of loose and small packages of traditional Chinese medicine (TCM), comprising: 1) establishing an equivalent physical model of a weighing system for loose and small packages, and, through Laplace transformation and Z transformation, obtaining a formula of the mass M of medicine packages to be weighed; 2) calculating $a_1$, $a_2$, $b_1$ and $b_2$ on the basis of a vector prediction error; 3) according to $a_1$, $a_2$, $b_1$, and $b_2$ obtained and the formula of the mass of medicine packages to be weighed, obtaining the mass of the loose and small packages of TCM that are weighed. According to the method, the scalar prediction error is expanded into the vector prediction error based on the traditional method so as to construct a new identification model based on the vector prediction error, and as a result the utilization efficiency of prediction error turns higher.

3 Claims, 3 Drawing Sheets

METHOD FOR QUICK WEIGHING OF LOOSE AND SMALL PACKAGES OF TRADITIONAL CHINESE MEDICINE (TCM)

TECHNICAL FIELD

The present disclosure relates to the technical field of automatic medicine cabinets, and in particular to a method for weighing traditional Chinese medicines in loose and small packages.

BACKGROUND

Traditional Chinese medicine (hereinafter referred to as TCM), which has a long history in China, is one of the three quintessences in Chinese culture. As a valuable asset of Chinese medicine, TCM has always enjoyed great popularity among patients. With the development of the age and the continuous progress of science and technology, traditional TCM decoction pieces have been transformed into new modern TCM ones, and small packages of TCM decoction pieces have emerged thereby. Small packages of TCM has many advantages, such as unchanged medicine character, accurate dosage, facilitating review, cleanness and hygiene, convenient dispensing, and improving efficiency, which have been widely used in medical institutions in recent decades and received very positive responses, seeing an extremely promising development prospect.

In the prior art, in order to improve the efficiency of TCM prescription filling and dispensing, many kinds of automatic TCM cabinets and automatic prescription filling devices have emerged. For example, an automatic medicine dispensing device with full-coverage chuck array and the control method thereof is provided in the previous application No. 201910614948.9 claimed by the applicant, wherein a full-coverage vacuum suction robot is disclosed, and this method uses this robot to grasp medicine packages and weighs the small packages of TCM by using an electronic weighing device and by controlling a vacuum-chuck air circuit, so as to obtain a specified number of medicine packages.

In the prior art, when vacuum chucks are used to grasp small packages of TCM, it cannot guarantee that each vacuum chuck can successfully grasp the medicine package, so when the vacuum chuck is controlled to release the medicine package, a problem may come out that a number of medicine packages dropped on the electronic weighing device may be inconsistent with the required number of medicine packages, thus affecting the time for prescription filling.

In addition, the electronic weighing device in the prior art will go through an unstable oscillation period if any medicine packages fall on it, during which there would be a large weighing error. In order to prevent the weighing accuracy from being affected by an electronic scale's oscillation caused by dropping medicine packages, usually, the practice in the prior art is to sample and calculate after the electronic scale resumes stability. However, waiting for the electronic scale to stabilize is time consuming and reduces the efficiency of prescription filling.

In order to solve the problem that the electronic scale has to wait until stabilized for weighing in the traditional weighing method, a dynamic weighing method is disclosed in a method for dynamic weighing of TCM in loose small packages with the patent No. 202010706273.3. Based on the traditional least square identification model, this method adopts a recursive algorithm which can reduce computing resources and overheads to a certain degree, thus reducing the weighing time and improving the weighing efficiency. However, it still works with current-time scalar prediction errors of the traditional identification model, which has a defect of low data utilization, so that the coefficient identification efficiency of this weighing model needs further improvement.

In addition, in the traditional identification model, a current-time scalar prediction error is used for recursive iteration every time and fails to effectively use an overall data change trend within the local neighborhood and the vector prediction error information, thus resulting in problems such as slow convergence of weighing model coefficients and large fluctuation of steady-state errors.

SUMMARY

For this purpose, the present disclosure aims at providing a method for quick weighing of loose and small packages of traditional Chinese medicine (TCM) in order to solve technical problems, i.e., to further improve the weighing accuracy and reduce the weighing time of loose and small packages of TCM.

According to the present disclosure, the method for quick weighing of loose and small packages of TCM includes:

1) Establishing an equivalent physical model of a weighing system for loose and small packages:

$$(M+m)\frac{dy(t)^2}{d^2 t}+c\frac{dy(t)}{dt}+ky(t)=Mgu(t) \tag{1}$$

Wherein, m is the equivalent mass of the medicine receiving tank; M is the mass of medicine packages to be weighed; y(t) is the output signal of the weighing system; g is the gravitational acceleration; c is the equivalent damping coefficient of the weighing system; k is the equivalent elastic coefficient of the weighing system; when loose and small packages of TCM fall on the medicine receiving tank, the medicine packages will vibrate synchronously with the weighing system represented by the medicine receiving tank, which may be regarded as applying a step signal Mgu(t) to the weighing system, wherein u(t) represents the step signal; after Laplace transformation, the output signal is obtained as follows:

$$Y(s)=Mg\cdot\frac{1}{s}\cdot\frac{1}{(M+m)s^2+cs+k} \tag{2}$$

Since the sampled signal is a discrete value, Z transformation is performed for Y(s) so as to obtain:

$$Y(z)=\frac{b_1 z^{-1}+b_2 z^{-2}}{1+a_1 z^{-1}+a_2 z^{-2}}\cdot U(z) \tag{3}$$

Wherein $a_1$, $a_2$, $b_1$, and $b_2$ are coefficients related to M, m, c, and k; and taking into account a weighing error caused by noise at an input terminal, the formula (3) is expressed by a difference equation as:

$$y(t)=-a_1 y(t-1)-a_2 y(t-2)+b_1 u(t-1)+b_2 u(t-2)+e(t) \tag{4}$$

In view of the formula (3) and according to the final-value theorem of the Z transformation, a system output in a steady state is obtained as follows:

$$\lim_{t\to\infty} y(t) = \lim_{z\to 1}(z-1)\cdot Y(z) = \frac{b_1+b_2}{1+a_1+a_2} = \frac{Mg}{k} \quad (5)$$

As a result, a calculation formula is obtained for the mass of medicine packages to be weighed M as follows:

$$M = \frac{k}{g}\cdot\frac{b_1+b_2}{1+a_1+a_2} \quad (6)$$

Wherein g is the gravitational acceleration, and k is the equivalent elastic coefficient of the weighing system;

2) Calculating $a_1$, $a_2$, $b_1$, and $b_2$ on the basis of a vector prediction error, including:

a) A scalar prediction error at the time t of a sample sequence of the weighing system is defined as:

$$e(t)=y(t)-[-\hat{a}_1 y(t-1)-\hat{a}_2 y(t-2)+\hat{b}_1 u(t-1)+\hat{b}_2 u(t-2)]=y(t)-\varphi_t^T \hat{\theta}_{t-1} \quad (7)$$

In the formula t>2, wherein:

$$\varphi_t=[-y(t-1),-y(t-2),u(t-1),u(t-2)]^2 \quad (8)$$

$$\hat{\theta}_{t-1}=[\hat{a}_1,\hat{a}_2,\hat{b}_1,\hat{b}_2]^T \quad (9)$$

$\varphi_t$ represents an information vector of the system at a time of the $t^{th}$ sample point, $\hat{\theta}_{t-1}$ represents a coefficient identification result of the system at a time before the $t^{th}$ sample point; y(t) represents a sample output sequence at the $t^{th}$ sample point, y(t−1) represents a sample output sequence at a time before the $t^{th}$ sample point, y(t−2) represents a sample output sequence at two times before the $t^{th}$ sample point; u(t−1) is a sample output sequence at a time before the $t^{th}$ sample point, u(t−2) is a sample output sequence at two times before the $t^{th}$ sample point; $\hat{a}_1$ is an estimated value of the coefficient $a_1$, $\hat{a}_2$ is an estimated value of the coefficient $a_2$, $\hat{b}_1$, is an estimated value of the coefficient $b_1$, and $\hat{b}_2$ is an estimated value of the coefficient $b_2$;

b) By taking into consideration $p_t$ sets of data in total from the time $t−p_t+1$ to the time t of the weighing system sample sequence, it is set that:

$$Y_t^{p_t} = \begin{bmatrix} y(t) \\ y(t-1) \\ \vdots \\ y(t-p_t+1) \end{bmatrix} \quad (10)$$

$$\Phi_t^{p_t} = [\varphi_t, \varphi_{t-1}, \cdots, \varphi_{t-p_t+1}] \quad (11)$$

Wherein: $p_t$ is a length of time window; $Y_t^{p_t}$ represents an output vector formed by inverting a sample output sequence within a range $p_t$ of the system previous to a time t; $\Phi_t^{p_t}$ represents an information matrix formed by inverting an information vector within a range $p_t$ previous to a time t; $p_t$ is a variable that varies along with any change of statistical properties of locally sampled data at the time t, resulting in the vector prediction error with an extended length of time window of $p_t$ as follows:

$$E_t^{p_t} = \begin{bmatrix} e(t) \\ e(t-1) \\ \vdots \\ e(t-p_t+1) \end{bmatrix} = \begin{bmatrix} y(t)-\varphi_t^T\hat{\theta}_{t-1} \\ y(t-1)-\varphi_{t-1}^T\hat{\theta}_{t-2} \\ \vdots \\ y(t-p_t+1)-\varphi_{t-p_t+1}^T\hat{\theta}_{t-p_t} \end{bmatrix} \quad (12)$$

$E_t^{p_t}$ represents a vector formed by inverting a scalar prediction error sequence within a range $p_t$ of the system previous to a time t; and, given that theoretically $\hat{\theta}_{t-1}$ is closer to a real value θ than an estimated value of a system coefficient at a previous time, $\hat{\theta}_{t-1}$ is used to replace the estimated value of the system coefficient at the previous time, so that the above formula may be altered into:

$$E_t^{p_t} = \begin{bmatrix} y(t)-\varphi_t^T\hat{\theta}_{t-1} \\ y(t-1)-\varphi_{t-1}^T\hat{\theta}_{t-1} \\ \vdots \\ y(t-p_t+1)-\varphi_{t-p_t+1}^T\hat{\theta}_{t-1} \end{bmatrix} = Y_t^{p_t} - \Phi_t^{T p_t}\hat{\theta}_{t-1} \quad (13)$$

It can be known from the formula (13) that the weighing system is based on an identification model of a vector prediction error:

$$\hat{Y}_t^{p_t} = \Phi_t^{T p_t}\hat{\theta}_{t-1} + E_t^{p_t} \quad (14)$$

The formula (14) is expressed as the identification model of the vector prediction error:

c) According to the identification model of the vector prediction error, a criterion function is defines as below:

$$J(\hat{\theta}_{t-1}) = \sum_{i=1}^{t}\left\|Y_i^{p_i} - \Phi_i^{T p_i}\hat{\theta}_{t-1}\right\|^2 = \sum_{i=1}^{t}\|E_i^{p_i}\|^2 \quad (15)$$

Wherein $\|E_i^{p_i}\|$ is a 2-norm of the vector $E_i^{p_i}$, and $J(\hat{\theta}_{t-1})$ is a criterion function;

d) $\hat{\theta}_{t-1}$ that may minimize the criterion function is evaluated to obtain a coefficient estimated value based on the identification model of the vector prediction error.

$$Z_t = \begin{bmatrix} Y_1^{p_1} \\ Y_2^{p_2} \\ \vdots \\ Y_t^{p_t} \end{bmatrix} \quad (16)$$

$$H_t = \begin{bmatrix} \Phi_1^{T p_1} \\ \Phi_2^{T p_2} \\ \vdots \\ \Phi_t^{T p_t} \end{bmatrix} \quad (17)$$

So that the criterion function may be expressed as:

$$J(\hat{\theta}_{t-1})=(Z_t-H_t\hat{\theta}_{t-1})^T(Z_t-H_t\hat{\theta}_{t-1}) \quad (18)$$

A vector differential formula is used to derive $J(\hat{\theta}_{t-1})$ and set the result thereof as 0, so as to calculate $\hat{\theta}_{t-1}$ that may minimize the criterion function:

$$\hat{\theta}_{t-1} = (H_t^T H_t)^{-1} H_t^T Z_t = \left[\sum_{i=1}^{t}\Phi_i^{p_i}\Phi_i^{T p_i}\right]^{-1}\left[\sum_{j=1}^{t}\Phi_j^{p_j}Y_j^{T p_j}\right] \quad (19)$$

d) The recursive calculation form of $\hat{\theta}_{t-1}$ is derived, which sets that:

$$R_t^{-1} = \sum_{i=1}^{t} \Phi_i^{p_i} \Phi_i^{T p_i} \qquad (20)$$

So that:

$$R_t^{-1} = R_{t-1}^{-1} + \Phi_t^{P_t} \Phi_t^{T p_t} \qquad (21)$$

After the simplification of the above formula by using the matrix inversion theorem, a recursive formula for identifying coefficients based on the identification model of vector prediction error is finally obtained as follows:

$$\begin{cases} \hat{\theta}_{t+1} = \hat{\theta}_t + L_{t+1} E_{t+1}^{p_t} & (22) \\ L_{t+1} = R_t \Phi_{t+1}^{p_t} [I_{p_t} + \Phi_{t+1}^{T p_t} R_t \Phi_{t+1}^{p_t}]^{-1} & (23) \\ R_{t+1} = R_t - L_{t+1} \Phi_{t+1}^{T p_t} R_t & (24) \end{cases}$$

Wherein $L_{t+1}$ is an algorithm gain vector; the coefficient estimation vector $\hat{\theta}_{t+1}$, at the time t+1 is the product of the gain vector $L_{t+1}$ and the vector prediction error $E_{t+1}^{p_t}$, which corrects the coefficient estimation vector $\hat{\theta}_t$ at the time t;

Here is the recursion process:
(1) Initialization: a start time is set as $t_0=5$, which indicates the recursion process starts from the fifth sampling point of the sampling sequence, $\hat{\theta}_5 = [0,0,0,0]^T$; $R_5 = \alpha \cdot I_4$, wherein a is a sufficiently large positive integer, $I_4$ represents an identity matrix of 4×4; and at the same time, a number of times, N, of recursive iteration is determined;
(2) By analyzing the statistical characteristics of locally sampled data, the length of time window $p_t$ is determined; at the same time, the sample output sequence and the input sequence of the weighing system are obtained to construct an output vector $Y_{t+1}^{p_t}$ according to the formula (10), and to construct an information matrix t according to the formulas (8) (11); and then a vector prediction error $E_{t+1}^{p_t}$ is obtained by using the formula (13);
(3) $L_{t+1}$ and $R_{t+1}$ are calculated according to the formula (23) and formula (24) in the recursion formula, and then $\hat{\theta}_{t+1}$ is calculated according to the formula (22);
(4) It is determined whether t=t+1 has reached a specified number of iteration times N. If not, proceed to the step (2), or otherwise end the recursion process;

3) According to $a_1$, $a_2$, $b_1$, and $b_2$ obtained in the step 2) and the formula (6), obtaining the weight of the loose and small packages of TCM that are weighed.

Further, the length of time window $p_t$ is determined by the method below:

A length interval of the time window of the $t^{th}$ sample time is defined as follows:

$$P_t \in [P_{min}, P_{max}] \qquad (25)$$

Wherein $P_{min}$ represents the lower limit value of the length interval, and $P_{max}$ represents the upper limit value of the length interval, i.e., the length of the time window $p_t$ can slide from $P_{min}$ to $P_{max}$ according to statistical characteristics of the sampled data;

A standard deviation of a sequence formed by d system sample output values previous to a time t is defined as follows:

$$S_t = \sqrt{\frac{\sum_{i=t-d+1}^{t}(y_i - \overline{y})^2}{d}} \qquad (26)$$

Wherein, it can be seen from tests for d that the stability and smoothness of local data can be better reflected when d=5; $y_i$ represents a system sample output value at the $i^{th}$ sample time, and $\overline{y}$ represents an average sample value of a sequence formed by d system sample output values previous to the time t, which is calculated by the following formula:

$$\overline{y} = \frac{1}{d} \cdot \sum_{i=t-d+1}^{t} y_i \qquad (27)$$

An initial recursive time of the recursive algorithm is set as $t_0$, and a sample standard deviation of d pieces of data previous to the initial time by the formula (26), which is set as $S_{t0}$; and a self-adaptive function of the time window length is used to determine the time window length $p_t$ at the sample time t as follows:

$$p_t = \left[\left(1 - \frac{S_t}{S_{t0}}\right) \cdot P_{max}\right] \qquad (28)$$

Wherein, $$\left[\left(1 - \frac{S_t}{S_{t0}}\right) \cdot P_{max}\right]$$

represents a maximum integer not more than a real number $$\left(1 - \frac{S_t}{S_{t0}}\right) \cdot P_{max}.$$

Further, in the recursion process, $\alpha = 10^7$, and the number of iteration times N is 8-10.

The present disclosure is beneficial in:
1. The traditional least square identification algorithm only uses a scalar prediction error at the latest time to correct a coefficient identification result at a time before in the course of the identification of $a_1$, $a_2$, $b_1$, and $b_2$, thus leading to quite low data utilization. According to the method for quick weighing of loose and small packages of TCM in the present disclosure, the scalar prediction error is expanded into the vector prediction error based on the traditional method so as to construct a new identification model based on the vector prediction error, and as a result the utilization efficiency of prediction error turns higher. It could be known through an actual weighing comparison test that, compared with the traditional weighing method, the weighing method provided by the present disclosure has faster convergence, higher coefficient identification accuracy, and reduces the weighing time and improves the weighing efficiency.
2. As for the time window length $p_t$ in the present disclosure, as the value of $p_t$ increases, the identification accuracy of the identification method based on an identification model of multi-vector prediction error will increase as well, however, correspondingly, the identification speed will decrease due to the increase of the time window width. As the value of $p_t$ decreases, the identification accuracy decreases as well, but the identification speed increases. Therefore, $p_t$ can be set neither too large nor too small, so it is a technical problem to take into consideration both identification accuracy and identification speed.

According to the method for quick weighing of loose and small packages of TCM, the time window length $p_t$ is automatically determined through the constructed self-adaptive function of the time window length, thereby the technical problem of balancing the identification accuracy and identification speed based on the identification model of the multi-vector prediction error is solved.

3. In the traditional identification model, a current-time scalar prediction error is used for recursive iteration every time and fails to effectively use an overall data change trend within the local neighborhood and the vector prediction error information, thus resulting in problems such as slow convergence of weighing model coefficients and large fluctuation of steady-state errors. However, the method for quick weighing of loose and small packages of TCM provided in the present disclosure constructs a new identification model based on the vector prediction error and uses the vector prediction error in the range of the time window length $p_t$ to perform recursive iteration, and makes full use of the overall change trend information of data within the local neighborhood. In addition, it is verified by experiment that compared with the identification model which adopts current-time scalar prediction error to perform recursive iteration each time the method of the present disclosure provides faster convergence of weighing model coefficients, and has an advantage of smaller fluctuation of steady-state errors.

4. The method for quick weighing of loose and small packages of TCM provided in the present disclosure is applied to not only weighing of loose and small packages of TCM, but also to other food or medicines in loose packages in need of quick weighing.

DETAILED DESCRIPTION

Figure 1:
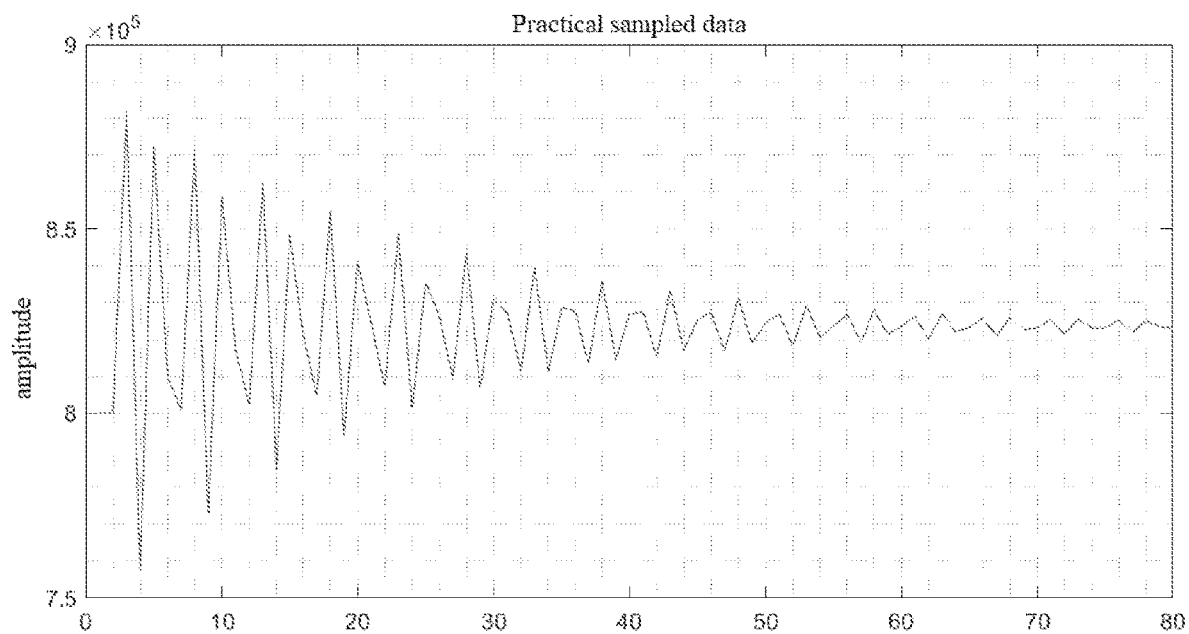
FIG. 1 is a graph of the AD sampling result of an electronic weighing signal.

The present disclosure will be further described with reference to figures and embodiments below.

In this embodiment, a method for quick weighing of loose and small packages of TCM is provided. The method is performed by a weighing system 400 comprising a weighing sensor 401 and a processor 402. The method includes:

1) Establishing an equivalent physical model of a weighing system for loose and small packages:

$$(M+m)\frac{dy(t)^2}{d^2t} + c\frac{dy(t)}{dt} + ky(t) = Mgu(t) \tag{1}$$

Wherein, m is the equivalent mass of the medicine receiving tank; M is the mass of medicine packages to be weighed; y(t) is the output signal of the weighing system; g is the gravitational acceleration; c is the equivalent damping coefficient of the weighing system; k is the equivalent elastic coefficient of the weighing system; when loose and small packages of TCM fall on the medicine receiving tank, the medicine packages will vibrate synchronously with the weighing system represented by the medicine receiving tank, which may be regarded as applying a step signal Mgu(t) to the weighing system, wherein u(t) represents the step signal. After Laplace transformation, the formula (1) obtains the output signal as follows:

$$Y(s) = Mg \cdot \frac{1}{s} \cdot \frac{1}{(M+m)s^2 + cs + k} \tag{2}$$

Since the sampled signal is a discrete value, Z transformation is performed for Y(s) so as to obtain:

$$Y(z) = \frac{b_1 z^{-1} + b_2 z^{-2}}{1 + a_1 z^{-1} + a_2 z^{-2}} \cdot U(z) \tag{3}$$

Wherein $a_1$, $a_2$, $b_1$, and $b_2$ are coefficients related to M, m, c and k. Taking into account a weighing error caused by noise at an input terminal, the formula (3) is expressed by a difference equation as:

$$y(t) = -a_1 y(t-1) - a_2 y(t-2) + b_1 u(t-1) + b_2 u(t-2) + e(t) \tag{4}$$

In view of the formula (3) and according to the final-value theorem of the Z transformation, a system output in a steady state is obtained as follows:

$$\lim_{t \to \infty} y(t) = \lim_{z \to 1}(z-1) \cdot Y(z) = \frac{b_1 + b_2}{1 + a_1 + a_2} = \frac{Mg}{k} \tag{5}$$

As a result, a calculation formula is obtained for the mass of medicine packages to be weighed M as follows:

$$M = \frac{k}{g} \cdot \frac{b_1 + b_2}{1 + a_1 + a_2} \tag{6}$$

Wherein g is the gravitational acceleration, and k is the equivalent elastic coefficient of the weighing system. k, as a constant related to the weighing system, may be determined by experiment.

It can be known from the formula (6) that the key point of calculating the mass M of medicine packages to be weighed is identification of the weighing system coefficients $a_1$, $a_2$, $b_1$, and $b_2$.

2) Calculating $a_1$, $a_2$, $b_1$, and $b_2$ on the basis of a vector prediction error, comprising:
a) A scalar prediction error at the time t of a sample sequence of the weighing system is defined as:

$$e(t) = y(t) - [-\hat{a}_1 y(t-1) - \hat{a}_2 y(t-2) + \hat{b}_1 u(t-1) + \hat{b}_2 u(t-2)] = y(t) - \varphi^T_t \hat{\theta}_{t-1} \tag{7}$$

In the formula t>2, wherein:

$$\varphi_t = [-y(t-1), -y(t-2), u(t-1), u(t-2)]^2 \quad (8)$$

$$\hat{\theta}_{t-1} = [\hat{a}_1, \hat{a}_2, \hat{b}_1, \hat{b}_2]^T \quad (9)$$

$\varphi_t$ represents an information vector of the system at a time of the $t^{th}$ sample point, $\hat{\theta}_{t-1}$ represents a coefficient identification result of the system at a time before the $t^{th}$ sample point; y(t) represents a sample output sequence at the $t^{th}$ sample point, y(t−1) represents a sample output sequence at a time before the $t^{th}$ sample point, y(t−2) represents a sample output sequence at two times before the $t^{th}$ sample point; u(t−1) is a sample output sequence at a time before the $t^{th}$ sample point, u(t−2) is a sample output sequence at two times before the $t^{th}$ sample point; $\hat{a}_1$ is an estimated value of the coefficient $a_1$, $\hat{a}_2$ is an estimated value of the coefficient $a_2$, $\hat{b}_1$ is an estimated value of the coefficient $b_1$, and $\hat{b}_2$ is an estimated value of the coefficient $b_2$.

b) By taking into consideration $p_t$ sets of data in total from the time $t-p_t+1$ to the time t of the weighing system sample sequence, it is set that:

$$Y_t^{p_t} = \begin{bmatrix} y(t) \\ y(t-1) \\ \vdots \\ y(t-p_t+1) \end{bmatrix} \quad (10)$$

$$\Phi_t^{p_t} = [\varphi_t, \varphi_{t-1}, \cdots, \varphi_{t-p_t+1}] \quad (11)$$

Wherein: $p_t$ is a length of time window; $Y_t^{p_t}$ represents an output vector formed by inverting a sample output sequence within a range $p_t$ of the system previous to a time t; $\Phi_t^{p_t}$ represents an information matrix formed by inverting an information vector within a range $p_t$ previous to a time t; $p_t$ is a variable that varies along with any change of statistical properties of locally sampled data at the time t, resulting in the vector prediction error with an extended length of time window of $p_t$ as follows:

$$E_t^{p_t} = \begin{bmatrix} e(t) \\ e(t-1) \\ \vdots \\ e(t-p_t+1) \end{bmatrix} = \begin{bmatrix} y(t) - \varphi_t^T \hat{\theta}_{t-1} \\ y(t-1) - \varphi_{t-1}^T \hat{\theta}_{t-2} \\ \vdots \\ y(t-p_t+1) - \varphi_{t-p_t+1}^T \hat{\theta}_{t-p_t} \end{bmatrix} \quad (12)$$

$E_t^{p_t}$ represents a vector formed by inverting a scalar prediction error sequence within a range $p_t$ of the system previous to a time t; and, given that theoretically $\theta_{t-1}$ is closer to a real value $\theta$ than an estimated value of a system coefficient at a previous time, $\theta_{t-1}$ is used to replace the estimated value of the system coefficient at the previous time, so that the above formula may be altered into:

$$E_t^{p_t} = \begin{bmatrix} y(t) - \varphi_t^T \hat{\theta}_{t-1} \\ y(t-1) - \varphi_{t-1}^T \hat{\theta}_{t-1} \\ \vdots \\ y(t-p_t+1) - \varphi_{t-p_t+1}^T \hat{\theta}_{t-1} \end{bmatrix} = Y_t^{p_t} - \Phi_t^{T_{p_t}} \hat{\theta}_{t-1} \quad (13)$$

It can be known from the formula (13) that the weighing system is based on an identification model of a vector prediction error:

$$\hat{Y}_t^{p_t} = \Phi_t^{T_{p_t}} \hat{\theta}_{t-1} + E_t^{p_t} \quad (14)$$

The formula (14) is expressed as the identification model of the vector prediction error.

c) According to the identification model of the vector prediction error, a criterion function is defines as below:

$$J(\hat{\theta}_{t-1}) = \sum_{i=1}^{t} \| Y_i^{p_i} - \Phi_i^{T P_i} \hat{\theta}_{i-1} \|^2 = \sum_{i=1}^{t} \| E_i^{p_i} \|^2 \quad (15)$$

Wherein $\| E_t^{p_t} \|$ is a 2-norm of the vector $E_t^{p_t}$, and $J(\hat{\theta}_{t-1})$ is a criterion function.

d) $\hat{\theta}_{t-1}$ that may minimize the criterion function is evaluated to obtain a coefficient estimated value based on the identification model of the vector prediction error.

$$Z_t = \begin{bmatrix} Y_1^{p_1} \\ Y_2^{p_2} \\ \vdots \\ Y_t^{p_t} \end{bmatrix} \quad (16)$$

$$H_t = \begin{bmatrix} \Phi_1^{T p_1} \\ \Phi_2^{T p_2} \\ \vdots \\ \Phi_t^{T p_t} \end{bmatrix} \quad (17)$$

So that the criterion function may be expressed as:

$$J(\hat{\theta}_{t-1}) = (Z_t - H_t \hat{\theta}_{t-1})^T (Z_t - H_t \hat{\theta}_{t-1}) \quad (18)$$

A vector differential formula is used to derive $J(\hat{\theta}_{t-1})$ and set the result thereof as 0, so as to calculate $\hat{\theta}_{t-1}$ that may minimize the criterion function:

$$\hat{\theta}_{t-1} = (H_t^T H_t)^{-1} H_t^T Z_t = \left[ \sum_{i=1}^{t} \Phi_i^{P_i} \Phi_i^{T P_i} \right]^{-1} \left[ \sum_{i=1}^{t} \Phi_i^{P_i} Y_i^{T P_i} \right]. \quad (19)$$

d) Although the formula of the coefficient $\hat{\theta}_{t-1}$ to be identified is obtained, this formula needs to use all the sample information of the weighing system starting from the sample start time. The actual calculation process consumes a large memory overhead, so that with the increase of sample data, the inversion calculation of $$\left[ \sum_{i=1}^{t} \Phi_i^{P_i} \Phi_i^{T P_i} \right]^{-1}$$

in the above formula will be great in amount, which decreases the identification speed. To solve these problems, the recursive calculation form is further derived for $\theta_{t-1}$. It is set that:

$$R_t^{-1} = \sum_{i=1}^{t} \Phi_i^{P_i} \Phi_i^{T P_i} \quad (20)$$

So that:

$$R_t^{-1} = R_{t-1}^{-1} + \Phi_t^{P_t} \Phi_t^{T P_t} \quad (21)$$

After the simplification of the above formula by using the matrix inversion theorem, a recursive formula for identifying coefficients based on the identification model of vector prediction error is finally obtained as follows:

$$\begin{cases} \hat{\theta}_{t+1} = \hat{\theta}_t + L_{t+1}E_{t+1}^{p_t} & (22) \\ L_{t+1} = R_t\Phi_{t+1}^{p_t}[I_{p_t} + \Phi_{t+1}^{Tp_t}R_t\Phi_{t+1}^{p_t}]^{-1} & (23) \\ R_{t+1} = R_t - L_{t+1}\Phi_{t+1}^{Tp_t}R_t & (24) \end{cases}$$

Wherein $L_{t+1}$ is an algorithm gain vector; the coefficient estimation vector $\theta_{t+1}$ at the time t+1 is the product of the gain vector $L_{t+1}$ and the vector prediction error $E_{t+1}^{p_t}$, which corrects the coefficient estimation vector $\hat{\theta}_t$ at the time t.

Here is the recursion process:
(1) Initialization: a start time is set as $t_0=5$, which indicates the recursion process starts from the fifth sampling point of the sampling sequence, $\hat{\theta}_5=[0,0,0,0]^T$; $R_5=\alpha \cdot I_4$, wherein a is a sufficiently large positive integer which is set as $\alpha=10^7$ in this embodiment, and $I_4$ represents an identity matrix of 4×4; and at the same time, a number of times, N, of recursive iteration is determined, which indicates the number of times that the recursive identification algorithm, based on the identification model of the vector prediction error, has been cycled and completed since the starting of the recursion process. According to results of many tests, when N=8□10 times, the error rate of the coefficient identification result $\hat{\theta}$ can be less than 2%; while N=10 in this embodiment.
(2) By analysing the statistical characteristics of locally sampled data, the length of time window $p_t$ is determined; at the same time, the sample output sequence and the input sequence of the weighing system are obtained to construct an output vector $Y_{t+1}^{p_t}$ according to the formula (10), and to construct an information matrix $\Phi_{t+1}^{p_t}$ according to the formulas (8) (11), where the sample output sequence is collected from the weighing sensor; and then a vector prediction error $E_{t+1}^{p_t}$ is obtained by using the formula (13).
(3) $L_{t+1}$ and $R_{t+1}$ are calculated according to the formula (23) and formula (24) in the recursion formula, and then $\hat{\theta}_{t+1}$ is calculated according to the formula (22).
(4) It is determined whether t=t+1 has reached a specified number of iteration times N. If not, proceed to the step (2), or otherwise end the recursion process.
3) According to $a_1$, $a_2$, $b_1$, and $b_2$ obtained in the step 2) and the formula (6), obtaining the weight of the loose and small packages of TCM that are weighed.

The only part of formulas (22) to (24) in the recursive formula that needs to be inverted is: $[I_{p_t}+\Phi_{t+1}^{Tp_t}R_t\Phi_{t+1}^{p_t}]^{-1}$, wherein $I_{p_t}$ and $I_{p_t}+\Phi_{t+1}^{Tp_t}R_t\Phi_{t+1}^{p_t}$ are both matrices of $p_t \times p_t$, so the inversion calculation only needs to invert the matrix of one $p_t \times p_t$. When $p_t$ is small, the calculation is significantly reduced in amount compared with the inversion calculation of $$R_t = \left[\sum_{i=1}^{t}\Phi_i^{p_i}\Phi_i^{Tp_i}\right]^{-1}.$$

Compared with the traditional least square identification algorithm with an identification model $y(t)=\varphi^T_t\hat{\theta}_{t-1}+e(t)$ and a recursive form $\hat{\theta}_{t+1}=\hat{\theta}_t+K_{t+1}e(t+1)$, every recursive process of the identification algorithm based on the identification model of vector prediction error uses multiple times of sampled data within a time window range that has a length of $p_t$ and is previous to the time t, which enables higher data utilization, and increases coefficient identification accuracy and weighing efficiency.

The length of time window $p_t$ in this embodiment is determined by the method below:

A length interval of the time window of the $t^{th}$ sample time is defined as follows:

$$P_t \in [P_{min}, P_{max}] \quad (25)$$

Wherein $P_{min}$ represents the lower limit value of the length interval, and $P_{max}$ represents the upper limit value of the length interval, i.e., the length of the time window $p_t$ can slide from $P_{min}$ to $P_{max}$ according to statistical characteristics of the sampled data;

A standard deviation of a sequence formed by d system sample output values previous to a time t is defined as follows:

$$S_t = \sqrt{\frac{\sum_{i=t-d+1}^{t}(y-\overline{y})^2}{d}} \quad (26)$$

Wherein, it can be seen from tests for d that the stability and smoothness of local data can be better reflected when d=5; $y_i$ represents a system sample output value at the $i^{th}$ sample time, and $\overline{y}$ represents an average sample value of a sequence formed by d system sample output values previous to the time t, which is calculated by the following formula:

$$\overline{y} = \frac{1}{d} \cdot \sum_{i=t-d+1}^{t} y_i \quad (27)$$

An initial recursive time of the recursive algorithm is set as $t_0$, and a sample standard deviation of d pieces of data previous to the initial time by the formula (26), which is set as $S_{t0}$; and a self-adaptive function of the time window length is used to determine the time window length $p_t$ at the sample time t as follows:

$$p_t = \left[\left(1-\frac{S_t}{S_{t0}}\right)\cdot P_{max}\right] \quad (28)$$

Wherein, $$\left[\left(1-\frac{S_t}{S_{t0}}\right)\cdot P_{max}\right]$$

represents a maximum integer not more than a real number $$\left(1-\frac{S_t}{S_{t0}}\right)\cdot P_{max}.$$

Figure 2:
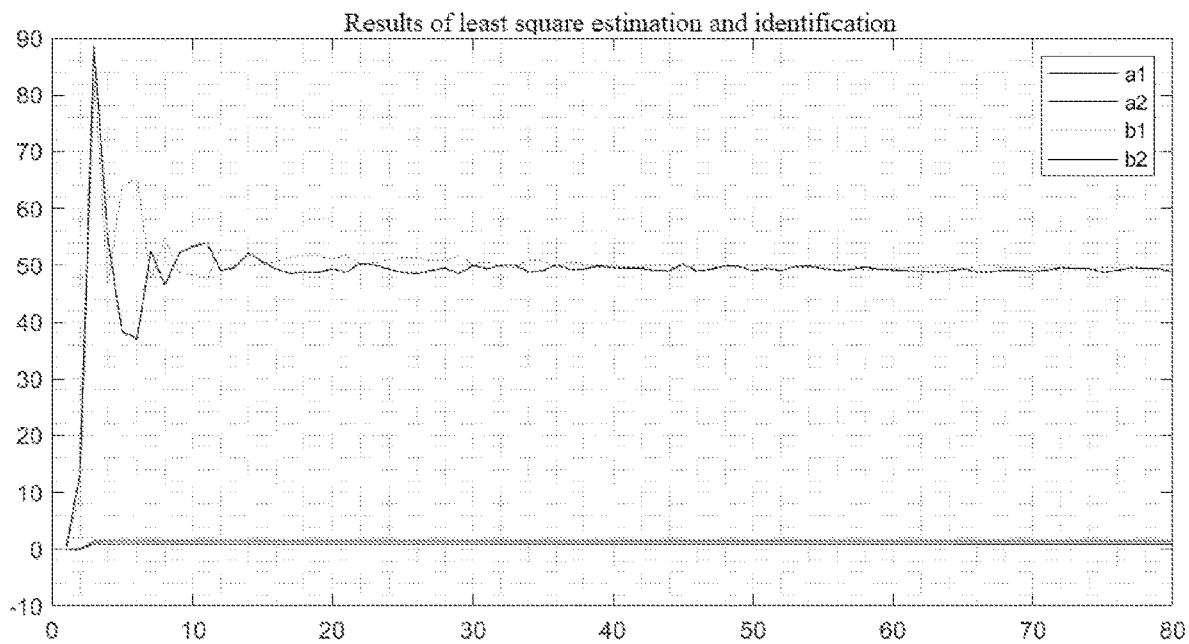
FIG. 2 shows the identification result by using the traditional least square identification method.
Figure 3:
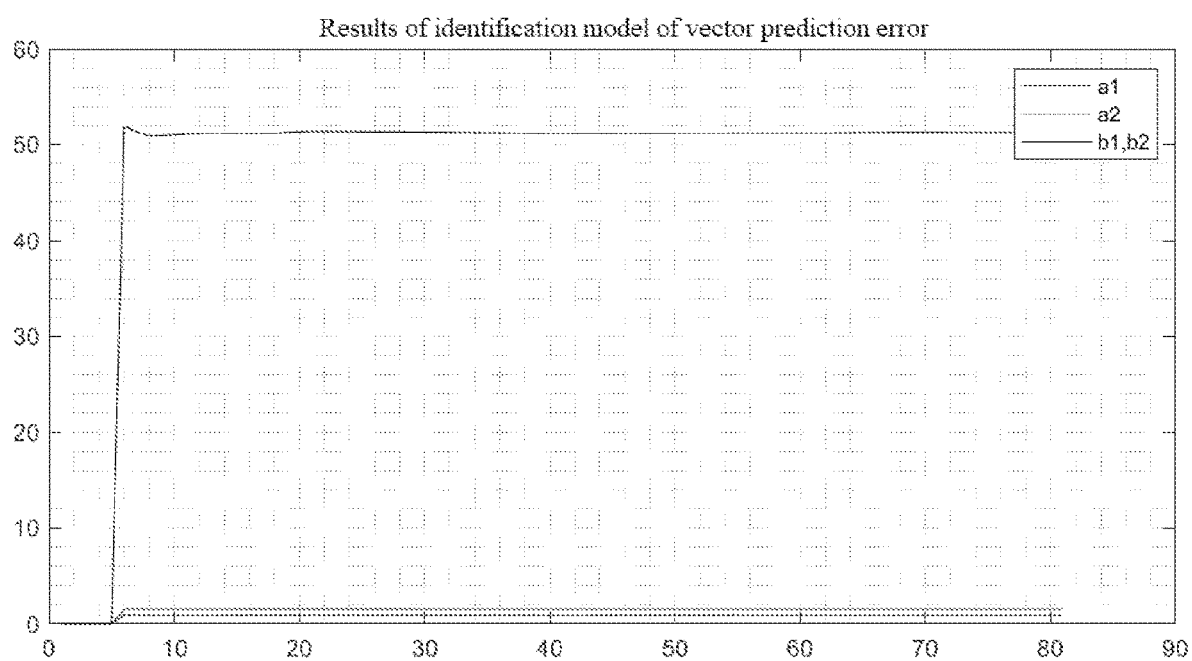
FIG. 3 shows the identification result based on the identification model of the vector prediction error.
Figure 4:
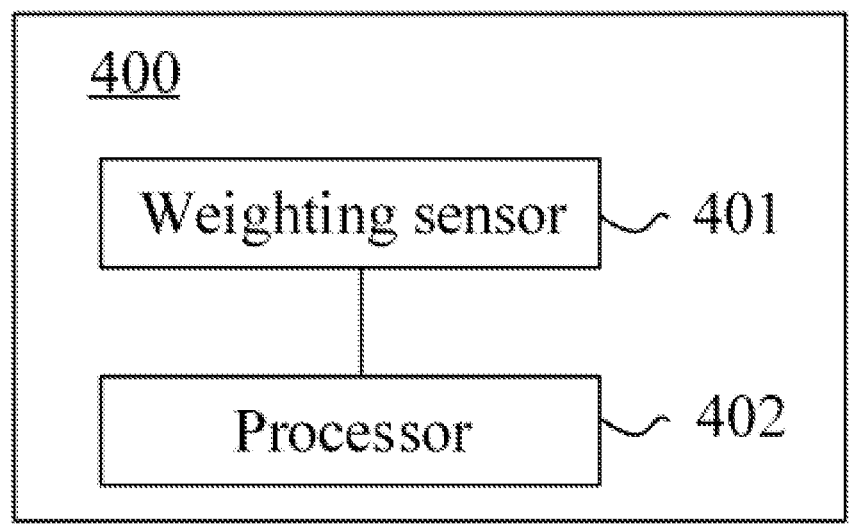
FIG. 4 shows a structure of a weighing system according to the present disclosure.

According to the method for quick weighing of loose and small packages of TCM in this embodiment, the actual weighing is carried out, wherein an AD sample frequency of an electronic weighing signal is 80 HZ, and an AD sample result is as shown in FIG. 1. Recursion is completed for the sampled data at sample points after the fifth sample points according to the recursion process described above. FIG. 2 shows the identification result by using the traditional least square identification method, and FIG. 3 shows the identification result based on the identification model of the vector prediction error. It can be seen from the comparison that the least square coefficient identification fluctuates greatly at the first 10 sample points, and the estimated value levels off when the coefficient identification achieves the 20th sample points.

The identification method based on the identification model of the vector prediction error has been stable since the start of coefficient identification without any large oscillation. When the recursion proceeds to the 10th sample point, the coefficient estimated value has levelled off. By setting the actual mass of the medicine packages as M0, the weighing result obtained by the least square identification method is M1, and the weighing result obtained by the identification model of the vector prediction error is M2. Ten groups of data are respectively taken for analysis and comparison, and the comparison results are shown as follows:

TABLE 1

Weighing Results Based on Traditional Least Square Method

| M0 | 30.65 | 30.65 | 30.65 | 30.65 | 30.65 | 30.65 | 30.65 | 30.65 | 30.65 | 30.65 |
|---|---|---|---|---|---|---|---|---|---|---|
| M1 | 52.75 | 33.93 | 31.81 | 31.40 | 31.48 | 31.37 | 31.44 | 31.41 | 31.32 | 31.46 |
| Sample point time t | 5 | 10 | 15 | 20 | 25 | 30 | 35 | 40 | 45 | 50 |
| Error rate | 72.1% | 10.7 | 3.8% | 2.4% | 2.7% | 2.3% | 2.5% | 2.4% | 2.1% | 2.6% |

TABLE 2

Weighing Results through Identification Based on Identification Model of Vector Prediction Error

| M0 | 30.6 | 30.65 | 30.65 | 30.65 | 30.65 | 30.65 | 30.65 | 30.65 | 30.65 | 30.65 |
|---|---|---|---|---|---|---|---|---|---|---|
| M2 | 42.8 | 31.14 | 31.12 | 31.13 | 31.17 | 31.16 | 31.17 | 31.16 | 31.15 | 31.17 |
| Sample time t | 5 | 10 | 15 | 20 | 25 | 30 | 35 | 40 | 45 | 50 |
| Error rate | 39.9 | 1.62 | 1.54% | 1.57 | 1.68% | 1.66% | 1.69% | 1.66% | 1.64% | 1.71% |

It can be seen by comparison that the identification result based on the identification model of vector prediction error is fast in weighing speed, whereby the error rate is less than 2% at the 10th sample time and the weighing result thereafter is relatively stable; while the weighing result levels off for convergence after the 20th sample time in the traditional least square identification model which takes longer to weigh and results in a lower weighing efficiency than that of the method provided in the present disclosure. It can be seen from the weighing result data that the steady-state error data of the weighing result based on the traditional least square identification method fluctuates greatly, while the steady-state error data of the method provided in the present disclosure fluctuates less.

After the 10th sample time, the maximum error rate of the weighing method provided in the present disclosure is only 1.71%, which means the actual error mass is less than 1 g for a medicine package of a mass specification of 30 g. Since the objective is to obtain an accurate quantity of medicine packages when weighing and counting TCM packages without critical demand of the total mass data of packages, so the weighing method of the present disclosure does not affect the accurate counting of medicine packages, and the weighing accuracy of the method provided in the present disclosure fully satisfies the quick weighing requirement of loose and small TCM packages. The weighing method according to the present disclosure can make good use of the dynamic response characteristics of the system without having to wait for the signal to level off, and make full use of dynamic information of the system without too much consideration about setting the time, which makes it particularly suitable for meeting the requirement of quick TCM prescription filling and dispensing in traditional TCM pharmacies.

In addition, in practical application, since the recursive identification method based on the identification model of vector prediction error does not need to save all the sample values from the sample start time after acquiring new sample values every time, it has the advantages of a high calculation efficiency and a low memory overhead.

Finally, it is noted that the above embodiments are only for the purpose of illustrating the technical scheme of the present disclosure without limiting it, and those of ordinary skills in the art should understand that the modified scheme or equivalent alternative scheme substantially the same as the technical scheme of the present disclosure should also be included in the claim scope of the present disclosure.

What is claimed is:

1. A method for quick weighing of loose and small packages of traditional Chinese medicine (TCM), which is performed by a weighing system comprising a weighing sensor and a processor, comprising:
   1) Establishing a calculation model for a mass of medicine packages by the processor, comprising:
      establishing an equivalent physical model of a weighing system for loose and small packages:

$$(M+m)\frac{dy(t)^2}{d^2t} + c\frac{dy(t)}{dt} + ky(t) = Mgu(t) \tag{1}$$

wherein, m is the equivalent mass of the medicine receiving tank; M is the mass of medicine packages; y(t) is the output signal of the weighing system; g is the gravitational acceleration; c is the equivalent damping coefficient of the weighing system; k is the equivalent elastic coefficient of the weighing system; when loose and small packages of TCM fall on the medicine receiving tank, the medicine packages will vibrate synchronously with the weighing system represented by the medicine receiving tank, which may be regarded as applying a step signal Mgu(t) to the weighing system, wherein u(t) represents the step signal; after Laplace transformation, the output signal is obtained as follows:

$$Y(s) = Mg \cdot \frac{1}{s} \cdot \frac{1}{(M+m)s^2 + cs + k} \qquad (2)$$

since the sampled signal is a discrete value, Z transformation is performed for Y(s) so as to obtain:

$$Y(z) = \frac{b_1 z^{-1} + b_2 z^{-2}}{1 + a_1 z^{-1} + a_2 z^{-2}} \cdot U(z) \qquad (3)$$

wherein $a_1$, $a_2$, $b_1$, and $b_2$ are coefficients related to M, m, C, and k; and taking into account a weighing error caused by noise at an input terminal, the formula (3) is expressed by a difference equation as:

$$y(t) = -a_1 y(t-1) - a_2 y(t-2) + b_1 u(t-1) + b_2 u(t-2) + e(t) \qquad (4)$$

in view of the formula (3) and according to the final-value theorem of the Z transformation, a system output in a steady state is obtained as follows:

$$\lim_{t \to \infty} y(t) = \lim_{z \to 1}(z-1) \cdot Y(z) = \frac{b_1 + b_2}{1 + a_1 + a_2} = \frac{Mg}{k} \qquad (5)$$

as a result, the calculation model for the mass of medicine packages M is obtained as follows:

$$M = \frac{k}{g} \cdot \frac{b_1 + b_2}{1 + a_1 + a_2} \qquad (6)$$

wherein g is the gravitational acceleration, and k is the equivalent elastic coefficient of the weighing system;

2) Establishing a recursive model for identifying coefficients based on an identification model of vector prediction error by the processor, comprising that:

a) a scalar prediction error at the time t of a sample sequence of the weighing system is defined as:

$$e(t) = y(t) - [-\hat{a}_1 y(t-1) - \hat{a}_2 y(t-2) + \hat{b}_1 u(t-1) + \hat{b}_2 u(t-2)] = y(t) - \varphi_t^T \hat{\theta}_{t-1} \qquad (7)$$

In the formula t>2, wherein:

$$\varphi_t = [-y(t-1), -y(t-2), u(t-1), u(t-2)]^T \qquad (8)$$

$$\hat{\theta}_{t-1} = [\hat{a}_1, \hat{a}_2, \hat{b}_1, \hat{b}_2]^T \qquad (9)$$

$\varphi_t$ represents an information vector of the system at a time of the $t^{th}$ sample point, $\hat{\theta}_{t-1}$ represents a coefficient identification result of the system at a time before the $t^{th}$ sample point; y(t) represents a sample output sequence at the $t^{th}$ sample point, y(t−1) represents a sample output sequence at a time before the $t^{th}$ sample point, y(t−2) represents a sample output sequence at two times before the $t^{th}$ sample point; u(t−1) is a sample output sequence at a time before the $t^{th}$ sample point, u(t−2) is a sample output sequence at two times before the $t^{th}$ sample point; $\hat{a}_1$ is an estimated value of the coefficient $a_1$, $\hat{a}_2$ is an estimated value of the coefficient $a_2$, $\hat{b}_1$ is an estimated value of the coefficient $b_1$, and $\hat{b}_2$ is an estimated value of the coefficient $b_2$;

b) by taking into consideration $p_t$ sets of data in total from the time $t-p_t+1$ to the time t of the weighing system sample sequence, it is set that:

$$Y_t^{p_t} = \begin{bmatrix} y(t) \\ y(t-1) \\ \vdots \\ y(t-p_t+1) \end{bmatrix} \qquad (10)$$

$$\Phi_t^{p_t} = [\varphi_t, \varphi_{t-1}, \cdots, \varphi_{t-p_t+1}] \qquad (11)$$

wherein: $p_t$ is a length of time window; $Y_t^{p_t}$ represents an output vector formed by inverting a sample output sequence within a range $p_t$ of the system previous to a time t; $\Phi_t^{p_t}$ represents an information matrix formed by inverting an information vector within a range $p_t$ previous to a time t; $p_t$ is a variable that varies along with any change of statistical properties of locally sampled data at the time t, resulting in the vector prediction error with an extended length of time window of $p_t$ as follows:

$$E_t^{p_t} = \begin{bmatrix} e(t) \\ e(t-1) \\ \vdots \\ e(t-p_t+1) \end{bmatrix} = \begin{bmatrix} y(t) - \varphi_t^T \hat{\theta}_{t-1} \\ y(t-1) - \varphi_{t-1}^T \hat{\theta}_{t-2} \\ \vdots \\ y(t-p_t+1) - \varphi_{t-p_t+1}^T \hat{\theta}_{t-p_t} \end{bmatrix} \qquad (12)$$

$E_t^{p_t}$ represents a vector formed by inverting a scalar prediction error sequence within a range $p_t$ of the system starting from a time t; and, given that theoretically $\hat{\theta}_{t-1}$ is closer to a real value θ than an estimated value of a system coefficient at a previous time, $\hat{\theta}_{t-1}$ is used to replace the estimated value of the system coefficient at the previous time, so that the above formula may be altered into:

$$E_t^{p_t} = \begin{bmatrix} y(t) - \varphi_t^T \hat{\theta}_{t-1} \\ y(t-1) - \varphi_{t-1}^T \hat{\theta}_{t-1} \\ \vdots \\ y(t-p_t+1) - \varphi_{t-p_t+1}^T \hat{\theta}_{t-1} \end{bmatrix} = Y_t^{p_t} - \Phi_t^{T p_t} \hat{\theta}_{t-1} \qquad (13)$$

it can be known from the formula (13) that the weighing system is based on the identification model of a vector prediction error:

$$\hat{Y}_t^{p_t} = \Phi_t^{T p_t} \hat{\theta}_{t-1} + E_t^{p_t} \qquad (14)$$

the formula (14) is expressed as the identification model of the vector prediction error:

c) according to the identification model of the vector prediction error, a criterion function is defines as below:

$$J(\hat{\theta}_{t-1}) = \sum_{i=1}^{t}\left\|Y_i^{p_i} - \Phi_i^{Tp_i}\hat{\theta}_{t-1}\right\|^2 = \sum_{i=1}^{t}\left\|E_i^{p_i}\right\|^2 \quad (15)$$

wherein $\|E_t^{p_t}\|$ is a 2-norm of the vector $E_t^{p_t}$, and $J(\hat{\theta}_{t-1})$ is a criterion function;

d) $\hat{\theta}_{t-1}$ that may minimize the criterion function is evaluated to obtain a coefficient estimated value based on the identification model of the vector prediction error, $$Z_t = \begin{bmatrix} Y_1^{p_1} \\ Y_2^{p_2} \\ \vdots \\ Y_t^{p_t} \end{bmatrix} \quad (16)$$

$$H_t = \begin{bmatrix} \Phi_1^{Tp_1} \\ \Phi_2^{Tp_2} \\ \vdots \\ \Phi_t^{Tp_t} \end{bmatrix} \quad (17)$$

so that the criterion function may be expressed as:

$$J(\hat{\theta}_{t-1}) = (Z_t - H_t\hat{\theta}_{t-1})^T(Z_t - H_t\hat{\theta}_{t-1}) \quad (18)$$

a vector differential formula is used to derive $J(\hat{\theta}_{t-1})$ and set the result thereof as $\hat{\theta}_{t-1}$ so as to calculate $\hat{\theta}_{t-1}$ that may minimize the criterion function:

$$\hat{\theta}_{t-1} = (H_t^T H_t)^{-1} H_t^T Z_t = \left[\sum_{i=1}^{t} \Phi_i^{p_i} \Phi_i^{Tp_i}\right]^{-1} \left[\sum_{i=1}^{t} \Phi_i^{p_i} Y_i^{Tp_i}\right] \quad (19)$$

d) the recursive calculation form of $\hat{\theta}_{t-1}$ is derived, which sets that:

$$R_t^{-1} = \sum_{i=1}^{t} \Phi_i^{p_i} \Phi_i^{Tp_i} \quad (20)$$

so that:

$$R_t^{-1} = R_{t-1}^{-1} + \Phi_t^{p_t}\Phi_t^{Tp_t} \quad (21)$$

after the simplification of the above formula by using the matrix inversion theorem, the recursive model for identifying coefficients based on the identification model of vector prediction error is finally obtained as follows:

$$\begin{cases} \hat{\theta}_{t+1} = \hat{\theta}_t + L_{t+1}E_{t+1}^{p_t} & (22) \\ L_{t+1} = R_t\Phi_{t+1}^{p_t}\left[I_{p_t} + \Phi_{t+1}^{Tp_t}R_t\Phi_{t+1}^{p_t}\right]^{-1} & (23) \\ R_{t+1} = R_t - L_{t+1}\Phi_{t+1}^{Tp_t}R_t & (24) \end{cases}$$

wherein $L_{t+1}$ is an algorithm gain vector; the coefficient estimation vector $\hat{\theta}_{t+1}$ at the time t+1 is the product of the gain vector $L_{t+1}$ and the vector prediction error $E_{t+1}^{p_t}$, which corrects the coefficient estimation vector $\hat{\theta}_t$ at the time t;

3) Calculating a weight of target medicine packages based on the calculation model for the mass of medicine packages and the recursive model for identifying coefficients by the processor, comprising:

(1) initialization: a start time is set as $t_0=5$, which indicates the recursion process starts from the fifth sampling point of the sampling sequence, $\hat{\theta}_5 = [0, 0, 0, 0]^T$;

$R_5 = \alpha \cdot I_4$, wherein $\alpha$ is a sufficiently large positive integer, $I_4$ represents an identity matrix of 4×4; and at the same time, a number of times, N, of recursive iteration is set;

(2) by analyzing the statistical characteristics of locally sampled data, the length of time window $p_t$ is determined; at the same time, the sample output sequence and the input sequence of the weighing system are obtained to construct an output vector $Y_{t+1}^{p_t}$ according to the formula (10), and to construct an information matrix $\Phi_{t+1}^{p_t}$ according to the formulas (8) (11), wherein the sample output sequence is collected from the weighing sensor; and then a vector prediction error $E_{t+1}^{p_t}$ is obtained by using the formula (13);

(3) $L_{t+1}$ and $R_{t+1}$ are calculated according to the formula (23) and formula (24) in the recursion formula, and then $\hat{\theta}_{t+1}$ is calculated according to the formula (22);

(4) it is determined whether t=t+1 has reached a specified number of iteration times N, if not, proceed to the step (2); or otherwise end the recursion process, thereby obtaining $a_1$, $a_2$, $b_1$, and $b_2$;

(5) according to $a_1$, $a_2$, $b_1$, and $b_2$ obtained in the step (4) and the formula (6), obtaining the weight of the loose and small packages of TCM that are weighed.

2. The method for quick weighing of loose and small packages of TCM according to claim 1, wherein: the length of time window $p_i$ is determined as below:

a length interval of the time window of the $t^{th}$ sample time is defined as follows:

$$P_t \in [P_{min}, P_{max}] \quad (25)$$

Wherein $P_{min}$ represents the lower limit value of the length interval, and $P_{max}$ represents the upper limit value of the length interval, i.e., the length of the time window $p_i$ can slide from $P_{min}$ to $P_{max}$ according to statistical characteristics of the sampled data;

a standard deviation of a sequence formed by d system sample output values previous to a time t is defined as follows:

$$S_t = \sqrt{\frac{\sum_{i=t-d+1}^{t}(y_i - \overline{y})^2}{d}} \quad (26)$$

wherein, it can be seen from tests for d that the stability and smoothness of local data can be better reflected when d=5; $y_i$ represents a system sample output value at the $i^{th}$ sample time, and $\overline{y}$ represents an average sample value of a sequence formed by d system sample output values previous to the time t, which is calculated by the following formula:

$$\overline{y} = \frac{1}{d} \cdot \sum_{i=t-d+1}^{t} y_i \quad (27)$$

an initial recursive time of the recursive algorithm is set as $t_0$, and a sample standard deviation of d pieces of data previous to the initial time by the formula (26), which is set as $S_{t0}$; and a self-adaptive function of the time window length is used to determine the time window length $p_t$ at the sample time t as follows:

$$p_t = \left[\left(1 - \frac{S_t}{S_{t0}}\right) \cdot P_{max}\right] \quad (28)$$

wherein, $$\left[\left(1 - \frac{S_t}{S_{t0}}\right) \cdot P_{max}\right]$$

represents a maximum integer not more than a real number $$\left(1 - \frac{S_t}{S_{t0}}\right) \cdot P_{max}.$$

3. The method for quick weighing of loose and small packages of TCM according to claim 1, wherein: in the recursion process, $\alpha=10^7$ a number of iteration times N is 8-10.

* * * * *